United States Patent [19]

Kuckes

[11] Patent Number: 5,485,089
[45] Date of Patent: Jan. 16, 1996

[54] METHOD AND APPARATUS FOR MEASURING DISTANCE AND DIRECTION BY MOVABLE MAGNETIC FIELD SOURCE

[75] Inventor: Arthur F. Kuckes, Ithaca, N.Y.

[73] Assignee: Vector Magnetics, Inc., Ithaca, N.Y.

[21] Appl. No.: 133,295

[22] Filed: Oct. 8, 1993

Related U.S. Application Data

[63] Continuation-in-part of Ser. No. 972,835, Nov. 6, 1992, abandoned.

[51] Int. Cl.$^6$ ................................ G01V 3/08; G01V 3/26
[52] U.S. Cl. ................................................ 324/346; 175/45
[58] Field of Search ...................... 324/346, 356, 324/369; 175/40, 45, 50; 166/65.1, 66, 66.5

[56] References Cited

U.S. PATENT DOCUMENTS

| | | |
|---|---|---|
| 2,183,565 | 12/1939 | Hawley . |
| 2,521,745 | 9/1950 | Pope . |
| 3,285,350 | 10/1966 | Henderson . |
| 3,350,634 | 10/1967 | Hoehn, Jr. . |
| 3,406,766 | 10/1968 | Henderson . |
| 3,731,752 | 5/1973 | Schad . |
| 3,745,446 | 7/1973 | Norris . |
| 3,853,185 | 12/1974 | Dahl et al. . |
| 4,072,200 | 2/1978 | Morris et al. . |
| 4,323,848 | 4/1982 | Kuckes . |
| 4,372,398 | 2/1983 | Kuckes . |
| 4,443,762 | 4/1984 | Kuckes . |
| 4,458,767 | 7/1984 | Hoehn, Jr. . |
| 4,465,140 | 8/1984 | Hoehn, Jr. . |
| 4,529,939 | 7/1985 | Kuckes . |
| 4,593,770 | 7/1986 | Hoehn, Jr. . |
| 4,700,142 | 10/1987 | Kuckes . |
| 4,710,708 | 12/1987 | Rorden et al. . |
| 4,791,373 | 12/1988 | Kuckes . |
| 5,151,658 | 9/1992 | Muramatsu et al. . |

*Primary Examiner*—Walter E. Snow
*Attorney, Agent, or Firm*—Jones, Tullar & Cooper

[57] ABSTRACT

Methods for determining the distance from a borehole to a nearby, substantially parallel target well for use in guiding the drilling of the borehole, including positioning a magnetic field sensor in the borehole at a known depth and providing a magnetic field source in the target well. The wells may be vertical or horizontal, and the source preferably is a solenoid movable in the target to a location at approximately the same depth as that of the sensor.

The distance between the borehole and the solenoid is determined, in one embodiment, by moving the solenoid to depths above and below the depth of the sensor, and detecting maximum field vectors. The distance the solenoid moves between the maxima is the distance between the wells. In another embodiment, the ratio of solenoid magnetic field vectors is used to determine the ratio of the difference in depth z between the solenoid and the sensor to the lateral distance R between the wells. This ratio z/r is then used to determine the separation of the wells.

33 Claims, 8 Drawing Sheets

METHOD AND APPARATUS FOR MEASURING DISTANCE AND DIRECTION BY MOVABLE MAGNETIC FIELD SOURCE

BACKGROUND OF THE INVENTION

The present application is a continuation-in-part of application Ser. No. 07/972,835 of Arthur F. Kuckes, filed Nov. 6, 1992 and entitled "Movable Solenoid Source in Target Well For Location Measurement", now abandoned.

The present invention is directed, in general, to a method for guiding the drilling of wells at a substantial depth in the earth, and more particularly to methods for determining the distance and direction to a target-well from a borehole being drilled.

The difficulties encountered in guiding the drilling of a borehole to intersect, to avoid, or to parallel an existing well at distances of thousands of feet below the surface of the earth are well known. Such guidance may be required when it is desired to avoid existing wells in a field, or when existing oil or gas wells have blown out and it becomes necessary to drill intersecting relief boreholes to prevent serious damage to underground gas or oil fields. Various electromagnetic methods for the precise drilling of such relief boreholes have been developed and have met with significant success during the past few years. Such methods and the instruments used are described, for example, in U.S. Pat. No. 4,323,848 and U.S. Pat. No. 4,372,398, both issued to the applicant herein, and in U.S. Pat. No. 4,072,200 to Morris et al. See, also, Canadian Patent No. 1,269,710 of Barnett et al, issued May 29, 1990.

Even though the guidance of boreholes with respect to existing wells is, in general, well developed, special problems can occur where existing techniques are not sufficient to provide the precise control required. For example, when it is desired to locate and to either avoid or to intersect a particular target well in a field which includes numerous other wells, problems can occur. Thus, when multiple wells lead from a single location, such as a drilling platform, it may become necessary to drill a borehole to avoid intersecting neighboring wells or, alternatively, to intersect a particular one of, for example, sixteen wells, all starting at approximately the same location and spreading downwardly and outwardly from each other. The borehole being drilled may start at the same general location as the other wellheads, or may start at a location several hundred feet from the wellhead of a target well. If intersection with a specific well is desired at, for example, three thousand feet below the surface, guidance information can be provided by a low-frequency alternating current injected into the earth, as from an electrode in the borehole being drilled, with the resulting earth current being concentrated in a casing or other electrically conductive material at the target well. The current so produced in the target well results in a magnetic field which can be detected from a highly sensitive magnetometer located in the borehole. However, in multiple-well fields, the use of such a current injection system results in a target current being induced in all of the wells in the region, not just the target well. This produces multiple magnetic fields which are superimposed at the borehole magnetometer, making it extremely difficult to obtain accurate distance measurements to the target well of interest, thus interfering with drill guidance.

Problems are also encountered in drilling non-parallel wells, such as a horizontal well through a field of vertical wells, or vice versa, where it is desired to avoid the existing wells, or in the alternative to intersect a specific well. Another area of difficulty occurs in the drilling of multiple horizontal wells, particularly where a well being drilled must be essentially parallel to an existing well. The need to provide two or more horizontal wells in close proximity, but with a precisely controlled separation, occurs in a number of contexts such as in steam assisted recovery projects in the petroleum industry, where steam is to be injected in one horizontal well and mobilized viscous oil is to be recovered from the other. This process is described, for example, in Canadian Patent No. 1,304,287 of Edmunds et al, which issued Jun. 30, 1992. Another example is in the field of toxic waste reclamation, where there is a need to drill parallel horizontal wells under waste disposal sites so that air can be pumped into one and toxic fluids forced into and recovered from the other. Again, in hot rock geothermal energy systems, there is a need to drill parallel wells so that cold water can be injected into one and hot recovered from the other.

The need to drill horizontal, parallel wells is of most immediate concern in the mobilization of heavy oil sands, where a borehole is to be drilled close to and parallel to an existing horizontal well with a separation of about ten meters for a horizontal extension of a thousand meters or more at depths of, for example, 500 to 1,500 meters. A number of such wells may be drilled relatively closely together, following the horizon of the oil producing sand, and such wells must be drilled economically, without the introduction of additional equipment and personnel.

SUMMARY OF THE INVENTION

The various difficulties encountered in the precise, controlled drilling of multiple boreholes in close proximity to each other are overcome, in accordance with the present invention, through the use of a standard downhole measurement while drilling (MWD) electronic survey instrument located in the borehole being drilled, in combination with a magnetic field source in the target well. In one embodiment of the invention, the MWD instrument, which includes a well logging magnetometer array, is located in the borehole being drilled at a selected depth, and a target field solenoid, suspended by a standard wireline or by a coiled tubing logging unit, is positioned in the target well. In the case where the drilling of the borehole is being guided with respect to a vertical target well, the target field solenoid is lowered in the target well until the horizontal component of the target magnetic field produced by the solenoid, as measured at the magnetometer, is close to zero, indicating that the solenoid is at approximately the same depth as the MWD instrument. The magnetometer logging array in the borehole is fixed at the selected depth, and measurements of the earth's apparent magnetic field are made with the solenoid off and on. The solenoid is then repositioned to locations above and below the MWD instrument, along the axis of the target well, and the above procedure repeated at each of a number of appropriate depths.

The solenoid produces different horizontal target magnetic fields in the earth at the different locations of the MWD magnetometer array, which change from the initial zero to maximum values as it is positioned at locations both above and below the location of the magnetometer array. The horizontal components of the target fields are measured and the field maxima are correlated with the axial positions of the solenoid. The distance which the solenoid moves between the lowermost and uppermost locations which correspond to horizontal magnetic field maxima below and above the zero field location, is the same as the horizontal distance (or separation) between the target well and the magnetometer at the depth of the magnetometer. Since the vertical position of the solenoid can be measured precisely, the distance between its locations at maximum magnetic field values can be determined exactly and the precise horizontal distance between the relief borehole and the target can be measured directly, with no mathematical manipulation of the values being required.

The target well may be a cased well, but even though a magnetic field produced by a solenoid located within a casing will be attenuated by a factor of up to 25, the sensitivity of the magnetometer is adequate for accurate distance measurement as far away as 25 meters or more. The solenoid appears as a point source for the target magnetic field at greater distances, but as the borehole being drilled moves close to the target well, the point source characterization of the solenoid changes. This is due to the finite length of the solenoid and the "pole smearing" effects caused by the ferromagnetism of the target well casing, which can result in the poles of the solenoid being smeared out over a length of up to four feet. Although this will cause the magnetic field source to be less well defined, and may introduce some inaccuracy, the method of measuring field maximum values described above produces distance measurements which allow reliable guidance of the drilling of the borehole. Well known mathematical methods are available for compensating for these effects.

The method described above for vertical wells may also be used in guiding the drilling of horizontal boreholes along controlled trajectories with respect to horizontal target wells. To make a determination of borehole separation distance and orientation with respect to the target well at a given depth (or distance from the wellhead) along the borehole being drilled, the drilling is stopped and a solenoid is deployed in the target well at a point approximately opposite the MWD instrument in the borehole being drilled. The solenoid apparatus may be deployed on the end of a standard coiled tubing logging unit which is capable of deploying it to a specified measured depth. Two MWD survey data measurements of the earth's apparent magnetic and gravity fields are made without moving the MWD instruments. During the first, the solenoid is energized positively; in the second measurement the same current in the reversed direction is used to energize the solenoid negatively. If the effective strength of the solenoid is known, these two data sets, together with standard survey parameters such as well direction and inclination, provide all the necessary information to determine both distance and direction between the wells. If the effective strength of the source is not known because, for example, it may be inside a steel casing which provides shielding, the solenoid is then moved a few meters to a new depth and a second MWD data set is obtained with the solenoid energized positively and negatively as above. These two field measurements at two depths, together with the depth increment by which the solenoid was moved, provide enough information to permit determination of the separation and relative orientation of the wells with respect to each other.

In another embodiment of the invention, the horizontal borehole is guided to be parallel to an existing horizontal target well at a substantial depth in the earth by the use of large direct currents injected at the wellheads of the wells, with the resulting magnetic fields being measured by the standard MWD instruments. Thus, a DC current source having an output of about 100 amperes at 10 volts is connected between the wellhead of the target well and the wellhead of the borehole. When a survey is required, the drill is stopped and the MWD sensor system is activated. A current of about 100 amperes is caused to flow in one direction on the target well casing for approximately 30 seconds, and then for approximately 30 seconds in the other direction. The MWD apparatus takes two measurements of the three components of the apparent earth's magnetic field, one during the first 30 second interval, and one during the second. The electromagnetic field data for the required proximity determination is found by simply taking the difference in the MWD magnetic field measurements with the current positive and with the current reversed. These measurements, together with down hole tool orientation measurements of the three components of the vertical gravity vector are used to determine the distance and direction between the two wells.

This latter technique can be carried out since the electrical resistance between the two wells in an oil producing sand is very low so that the injection of a large current into a wellhead is relatively easy. Furthermore, the bleed-off rate of the current from such wells is slow and calculable so that at the depths of interest, enough current is still on the well casing to have a significant effect on the magnetic field sensors in the MWD package to permit precise drilling control of the well.

Although a principal application of the methods of the present invention is in guiding a borehole being drilled in a direction generally parallel to that of an existing well, the method is also applicable to the case where the two wells are not parallel, as where a horizontal borehole is to be drilled through a field of existing vertical wells.

BRIEF DESCRIPTION OF THE DRAWINGS

The foregoing, and additional objects, features, and advantages of the present invention will become apparent to those of skill in the art from the following detailed description of preferred embodiments, taken in conjunction with the accompanying drawings, in which.

DESCRIPTION OF PREFERRED EMBODIMENTS

Figure 1:
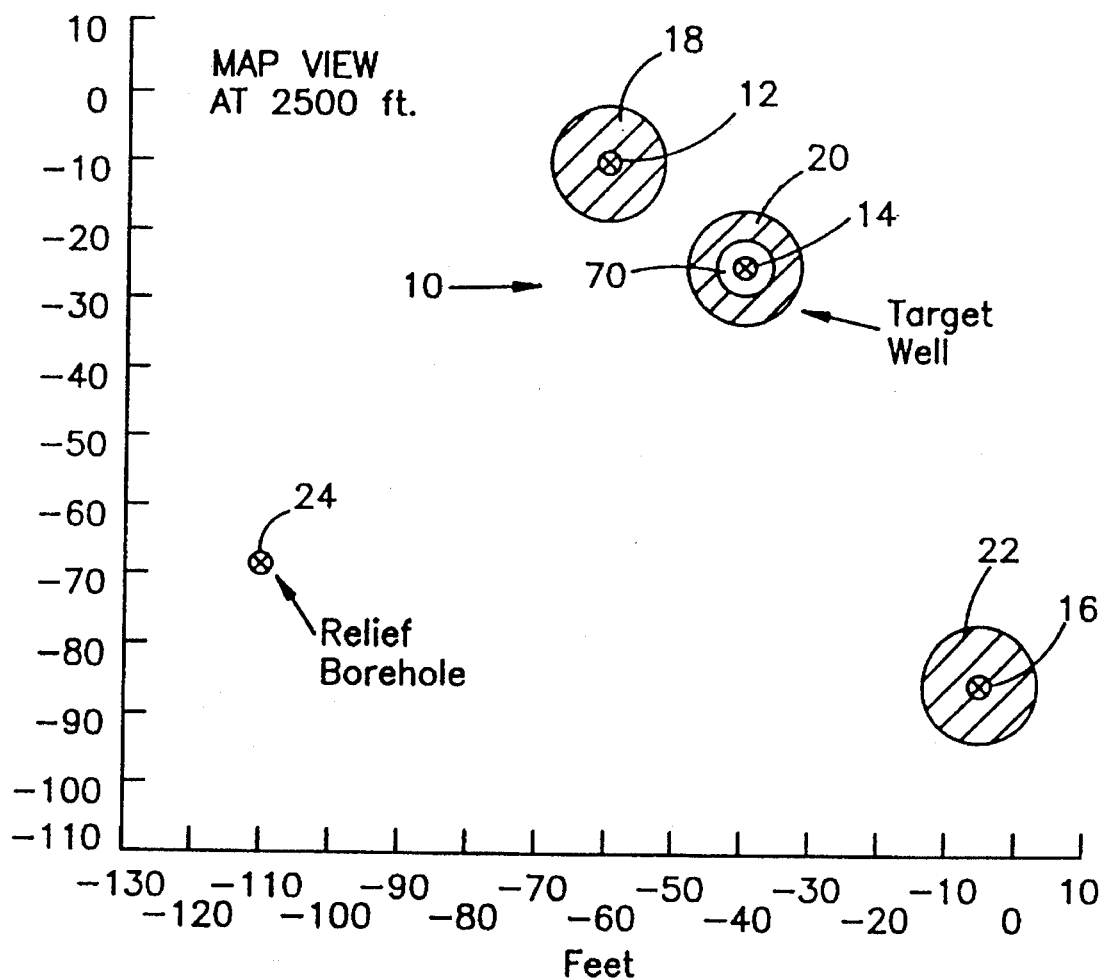
FIG. 1 is a diagrammatic top plan, or map, view of the relative locations of a target well, two nearby wells, and a relief borehole in an example of the use of a first embodiment of the invention in a well field.

Turning now to a more detailed description of the present invention, there is illustrated in FIG. 1 in top plan, or map, view a typical grouping of wells in, for example, an oil field or a gas field where a number of wells have been drilled, or are in the process of being drilled, from a common region at the earth's surface. Such groupings are often found in off-shore drilling, where numerous wells originate from a single platform, but such groupings are also commonly used in on-shore fields. Three generally vertical wells 12, 14 and 16, which may be part of a much larger grouping, are illustrated, with their relative locations being depicted at a depth of, for example, 2500 feet below the surface. At this depth, wells 12 and 14 may be spaced apart by a distance of, for example, 25 feet, while wells 14 and 16 may be 60 feet apart. Because of the inaccuracies inherent in well drilling and well logging techniques, there is a degree of uncertainty about the exact location of each well. This is illustrated by the so-called "ellipse of uncertainty" illustrated by the ellipses 18, 20 and 22, surrounding the wells 12, 14 and 16, respectively. This ellipse of uncertainty represents the possible variations in the actual location of each of the producing wells by reason of the inaccuracies of commonly used well surveying techniques.

As occasionally happens, a well, which may be in the process of being drilled or which may be actually producing, may encounter difficulties such as a blow out, which cannot be overcome from the wellhead of the damaged well. In such a case, it may be necessary to drill a relief well, or borehole 24, which starts at a distance from the wellhead of the damaged well and is drilled generally vertically downwardly at an angle to intersect the damaged well at a selected depth. It may be necessary to drill the relief borehole from a distance of, for example, several hundred feet from the wellhead of the damaged well and to angle the relief borehole so as to make tangential contact with the damaged well at a depth of approximately 3000 feet.

The damaged well, which is illustrated as well 14 in FIG. 1, and which will be referred to hereinafter as the target well, may be exemplified by a cased well having a 20" casing down to a depth of about 2400 feet, and having a 13" casing below that point. The purpose of the relief borehole may be to make tangential contact with the target well at the 3000 foot depth so that cement can be squeezed into the annulus on the outside of the 13" casing to fill this annulus up to the shoe which joins the 13" casing with the 20" casing.

It is important that a relief borehole be drilled in such a way that it does not unexpectedly penetrate the target well, so that the integrity of the well is maintained, while at the same time moving close enough to the target well to establish contact at a preselected depth. The problem, as illustrated in FIG. 1, is that surveys of target wells may result in an ellipse of uncertainty 20 having a radius of 8 feet or more. As the relief borehole 24 approaches the target well 14, the ellipse of uncertainty makes it extremely difficult to accurately direct the drilling of the relief borehole.

The use of current-emitting electrodes to generate earth currents which produce corresponding magnetic fields originating from induced current flow in the target well casing, as described in the above-mentioned U.S. Pat. Nos. 4,323,848 and 4,372,398 would, in normal circumstances, permit accurate directional drilling of the relief borehole to the target well. However, in the situation illustrated in FIG. 1, the problem of locating the target well is exacerbated by the presence of nearby cased wells 12 and 16 which are approximately the same distance from the relief borehole at 2500 feet (in this example) as is the target well. In such a circumstance, prior current injection techniques produce magnetic fields which are centered on all three wells which, at distances of about 20 feet or more from the target well, make mathematical analysis of the fields to isolate the target well impractical.

Figure 2:
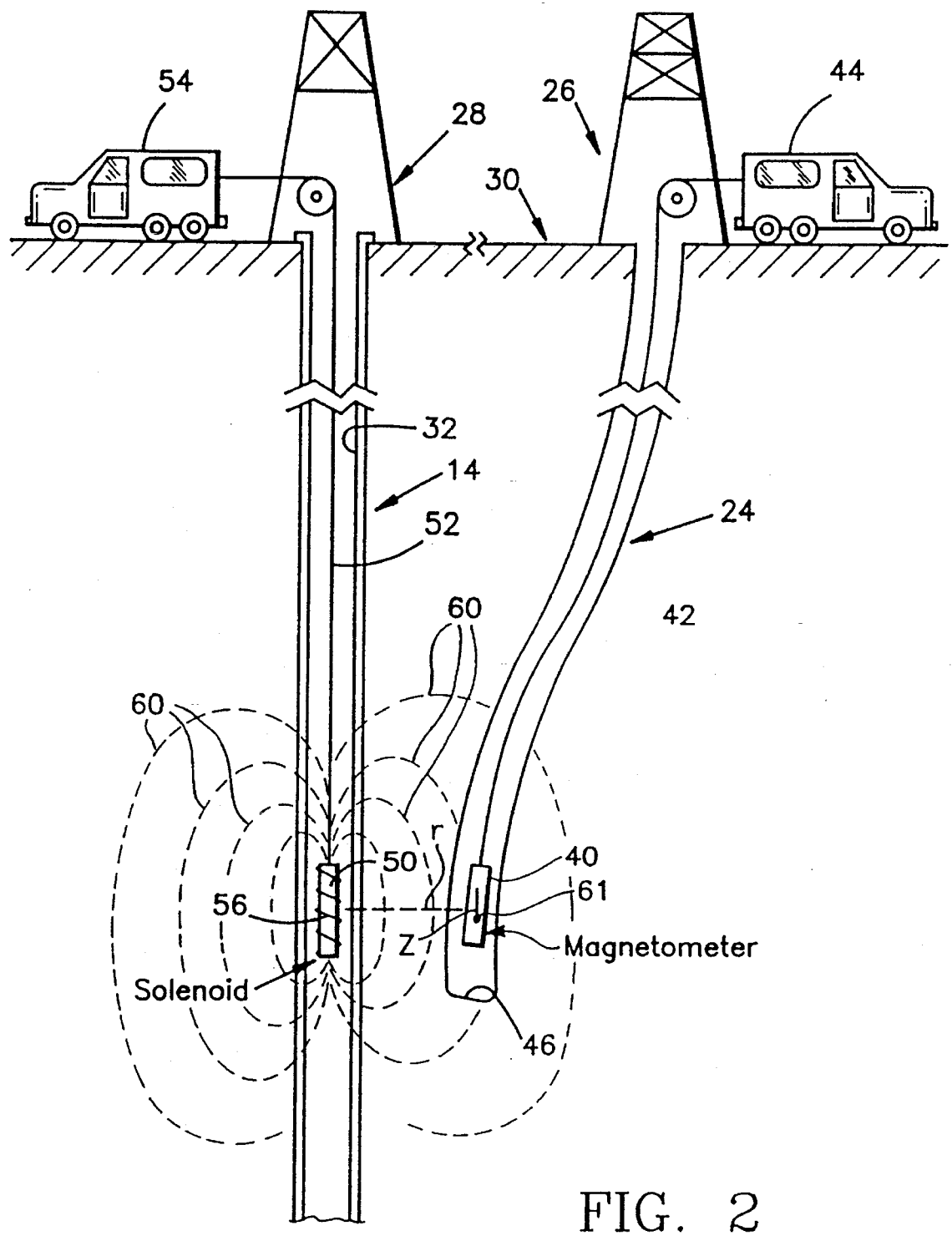
FIG. 2 is a diagrammatic side elevation view of the relative locations of a vertical target well containing a solenoid and a generally vertical relief borehole containing a directional magnetic field sensor, for distance and direction determination in accordance with a first embodiment of the present invention.

In those cases where the wellhead of the target well is accessible, however, the distance between the relief borehole and the target well can be determined with great accuracy, in accordance with the present invention, in the manner illustrated in FIG. 2. As there illustrated, the relief borehole 24 is drilled from a wellhead 26 spaced away from the wells 14, 16 and 18, and particularly from the wellhead 28 of the target well 14. The relief borehole is drilled vertically downwardly from the surface 30 of the earth and then is angled toward well 14 for intersection or tangential contact at a predetermined depth. Target well 14 may include a steel casing 32 in conventional manner as noted above, or may be uncased, while the relief borehole 24 is uncased.

In the course of drilling the relief borehole 24, the drill string (not shown) is periodically withdrawn to allow logging of the borehole by means of a separate sensor such as a highly sensitive magnetometer 40, preferably a fluxgate magnetometer such as that illustrated in U.S. Pat. No. 4,372,398. The magnetometer is lowered into the borehole by means of a wireline 42 connected at its upper end to a suitable logging vehicle 44. The logging vehicle includes the surface electronic equipment to which the magnetometer 40 is connected, which equipment may include, for example, a personal computer for operating the magnetometer and for measuring and recording magnetic field signals detected in the borehole, as will be explained below. The magnetometer 40 is lowered by means of wireline 42 to a location at or near the bottom end 46 of the relief borehole 24 and is fixed at a predetermined depth for the purpose of making the required magnetic field measurements.

Figure 2A:
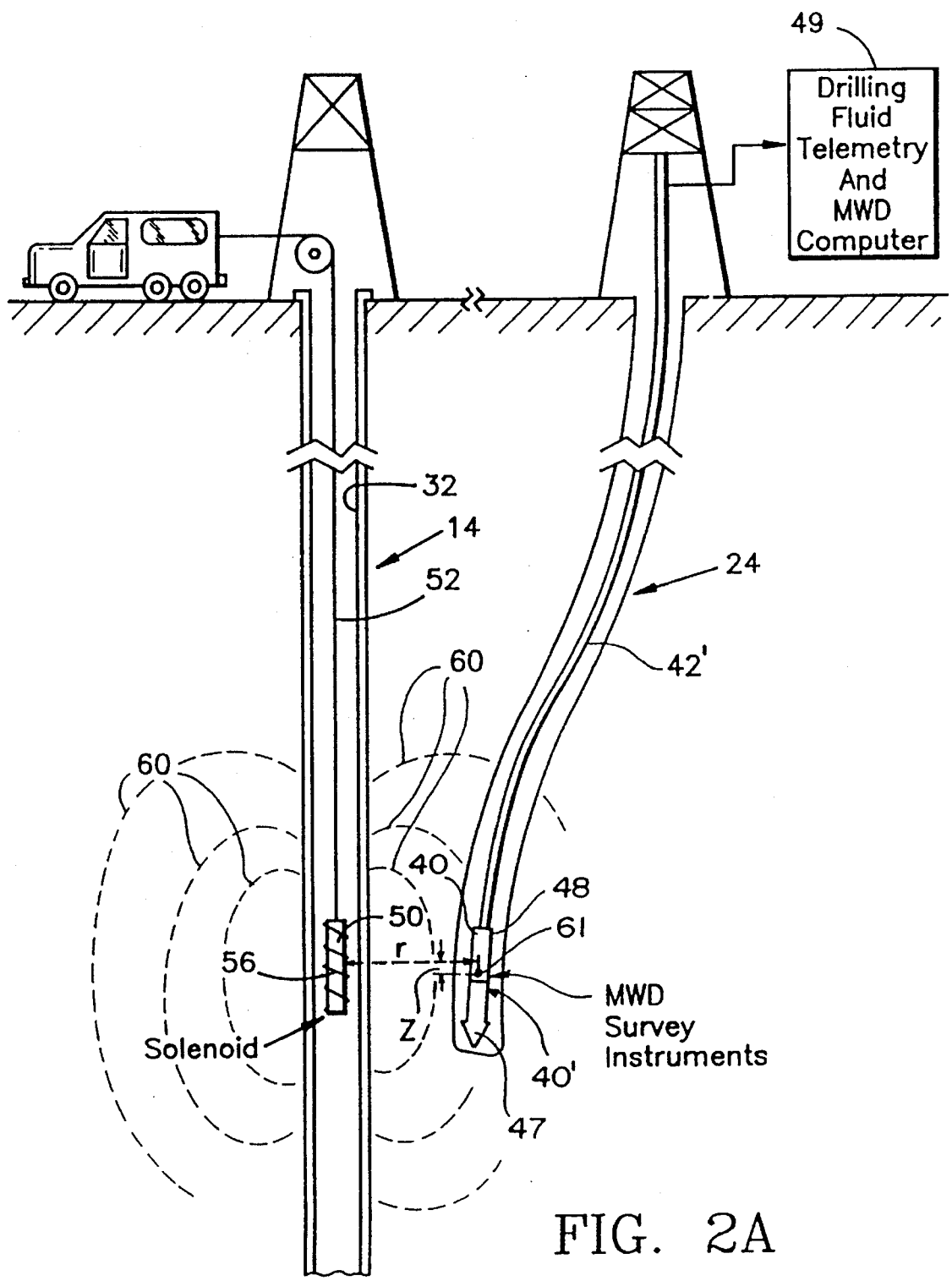
FIG. 2A is a diagrammatic side elevation view of the relative locations of a vertical target well and a generally vertical relief borehole containing an MWD directional drilling system.

Alternatively, as illustrated in FIG. 2A, the magnetometer 40 can be part of a standard downhole measurement while drilling (MWD) instrument 40', such as that offered by Sperry Sun Corporation, carried by a drill string 42'. Such equipment consists of a downhole, orientable directional drilling motor 47 and an electronics package 48 which measures three components (x, y, z) of the earth's static magnetic field, and three components (x, y, z) of the earth's gravity vector with respect to the drilling instrument. The values of these quantities can be communicated to the surface using drilling fluid pressure pulses which are sensed by surface telemetry and an associated MWD computer illustrated at 49.

For use in determining the distance and direction from the relief borehole 24 to the target well 14, a solenoid 50 secured to a wireline 52 is lowered into the target well 14 through the well casing 32. The upper end of wireline 52 is connected to a well logging vehicle 54 by means of which the solenoid 50 can be raised and lowered within casing 32 to specified measured depths. The solenoid includes windings 56 which are connected to a low frequency source, for example 1.67 Hz, of alternating current at the surface of the earth or a D.C. source which can be switched on and off, and which can be reversed in polarity. The source may be located, for example, in the vehicle 54. When current is supplied to winding 56 on the solenoid 50, a target magnetic field, generally indicated by the field lines 60, is produced in the earth surrounding the target well 14. Casing 32 attenuates the field and may smear the upper and lower poles of the solenoid, so that the solenoid appears to be longer than it actually is. However, even a modest current, in the range of a few amps, will generate a magnetic field which is readily measured 150 feet or more away. At a distance of greater than about 20 feet, the solenoid appears effectively as a point source so that the simplest analysis of the measurements will provide accurate guidance of the relief borehole. At a closer range, the smearing effect of the poles and the finite solenoid length may require more complex analysis using well known mathematical methods for compensating smearing and finite source length.

If direct current is used to energize the solenoid, positive and then negative current is used. The apparent earth's field values obtained with positive and negative energization are subtracted from each other in order to evaluate the solenoid field components and to cancel the earth's field components.

In accordance with the embodiment of FIGS. 2 and 2A, for the measurement of substantially vertical wells the solenoid 50 is energized and lowered in the target well 14 until it lies in the approximately same horizontal plane as the magnetometer 40. When the solenoid is horizontally opposite to the magnetometer, the magnetometer output will indicate no horizontal field component due to the magnetic field 60. Thereafter, when the energized solenoid is positioned above the depth of magnetometer 40, the value of the magnetic field at the magnetometer will increase in one direction, and when the solenoid is lowered below the depth of magnetometer 40, the output of the magnetometer will increase in the opposite direction.

The horizontal, radially directed component of the magnetic field $H_r$ amps/meter generated by the solenoid 50, is characterized by a magnetic dipole moment of m ampere meter$^2$ at a point 61 which is a lateral distance r meters (FIG. 2) and a vertical distance z meters in the nominally vertical direction above or below the depth of the solenoid, is given by $$H_r = \frac{mrz}{4\pi (r^2 + z^2)^{5/2}} \quad \text{(Eq. 1)}$$

Figure 3:
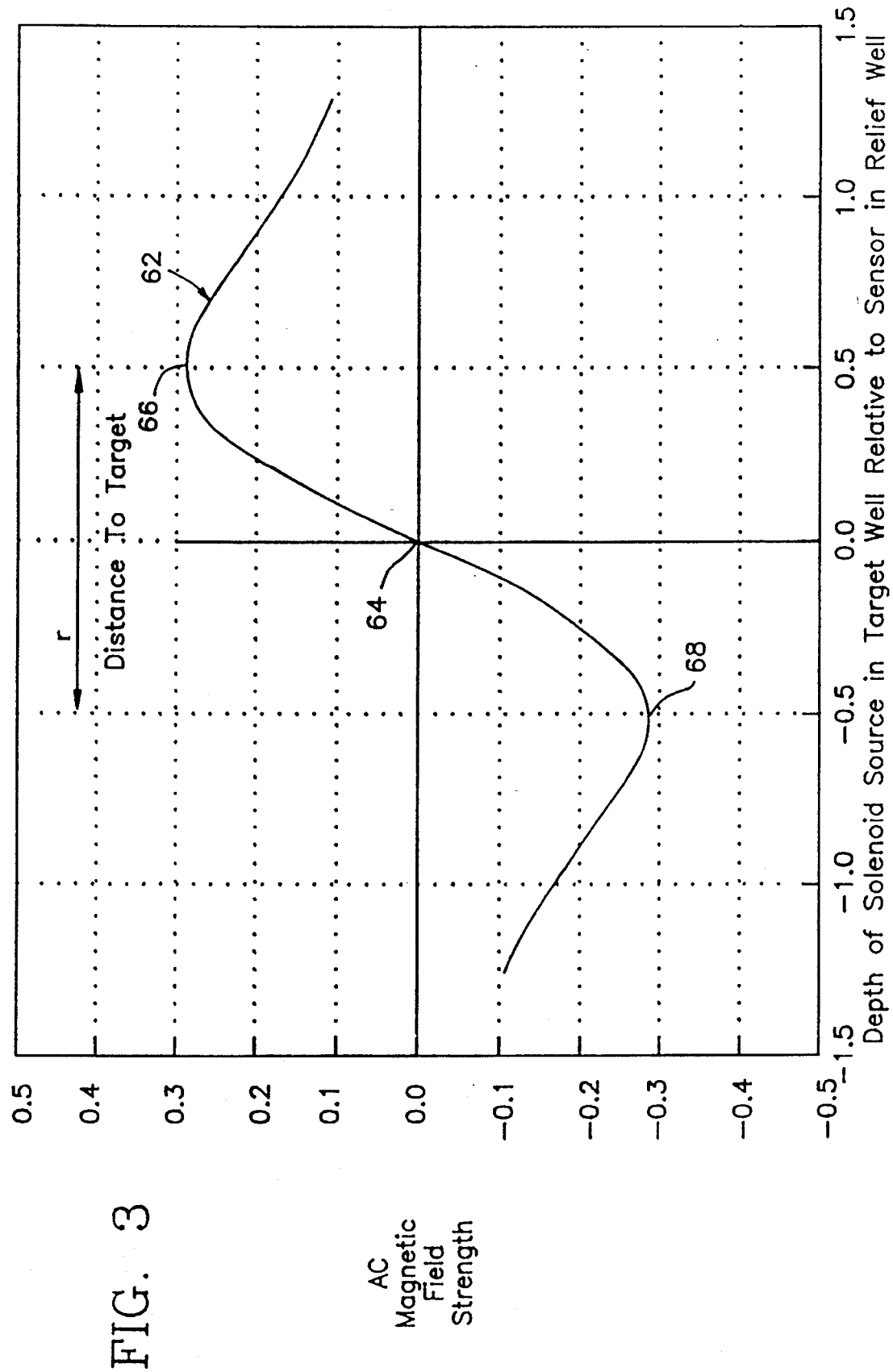
FIG. 3 is a graphical illustration of the variation of the measured magnetic field at the sensor of FIG. 2 at different vertical locations of the solenoid in the target well.

This function, which is plotted in FIG. 3 by curve 62, shows that the vertical distance interval of the solenoid between the maximum values of the horizontal field component $H_r$ is equal to the horizontal separation distance r.

Figure 4:
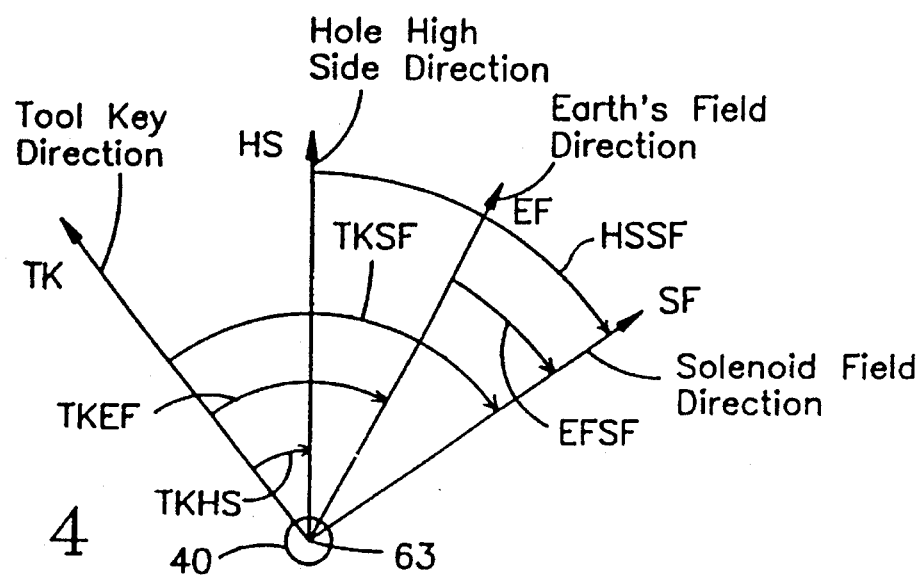
FIG. 4 is a graphical illustration of the relationship between magnetic fields and borehole directions at the sensors of the embodiment of FIG. 2.

The direction to the target well is also easily found by including the magnetometer 40 in an orientation package which may include, in addition to the magnetometers, accelerometers or inclinometers, or a gyroscope used in a manner as disclosed in U.S. Pat. No. 4,700,142, issued to the applicant herein. In the present case the direction of the horizontal field component at the relief borehole 24 will point either toward or away from the target well 14, depending upon whether the solenoid 50 is above or below the sensing apparatus 40. FIG. 4 diagrammatically shows the various quantities which may be measured in the plane of measurement which is perpendicular to the axis 63 of the sensing or magnetometer 40.

As illustrated in FIG. 4, the tool key direction indicated by vector TK indicates a radial direction from the tool axis to a key fixed to the tool body and thus dependent on the orientation of the tool in the borehole. HS is the direction to the high side of the borehole, as indicated by inclinometers or accelerometers, when the borehole is sloped, or off vertical, as described in U.S. Pat. No. 4,700,142. EF is the direction of the earth's magnetic field in the plane of measurement, and SF the radial direction of the solenoid field in the plane of measurement. The angles TKSF, TKEF and TKHS are found from the voltage outputs of the various sensors in magnetometer 40. The angles HSSF and EFSF are the directions between the high side (HS) of the borehole and the solenoid target field, and the direction between the earth's field and the target field, respectively, and give the direction to the target. FIG. 4 shows that $$HSSF = TKSF - TKHS \quad \text{(Eq. 2)}$$

$$EFSF = TKSF - TKEF \quad \text{(Eq. 3)}$$

If a gyroscope is included in the sensor apparatus a similar procedure can be used to relate the direction to the solenoid field to the spatial direction indicated by the gyroscope.

If the wells are not parallel, well known mathematical methods are readily formulated to provide direction and lateral distance between the wells from the complete three component set of MWD magnetic field and inclometer data sets, as will be shown.

The changes in the output of the magnetometer as a result of the measurement of the solenoid magnetic field at different vertical positions of the solenoid 50 above and below the horizontal plane which contains the magnetometer 40 is illustrated in FIG. 3 by the curve 62. Measurement of the solenoid field can be made at discrete locations of the solenoid with respect to the magnetometer as the solenoid is moved along the axis of the target well, and these discrete measurements produce points along curve 62. The horizontal component of the target magnetic field passes through zero when the depth of the solenoid 50 passes through the horizontal plane which includes the magnetometer 40, as indicated at intersection 64 in FIG. 3.

When an AC magnetic field energizes solenoid 50, and the solenoid is either above or below the depth of sensor 40, the electromagnetic field produced by the solenoid includes significant components in the horizontal plane either pointing toward or away from the target well. As the solenoid moves upwardly above or downwardly below the horizontal plane of the magnetometer with either AC or DC excitation, the sensed horizontal magnetic field component increases with distance from the horizontal plane to maximum values, indicated at 66 and 68 on curve 62; thereafter, further motion of the solenoid along the axis of the target well away from the horizontal plane of the magnetometer will result in a decreasing magnetic field strength due to the increasing distance, again as indicated by the curve 62.

The position of solenoid 50 along the axis of the target well 14 is easily measured at the logging vehicle 54 simply by measuring the length of wireline 52. As described above, the vertical distance z which the solenoid moves in the target well, between the upper maximum point 66 and the lower maximum point 68 of the horizontal component $H_r$ of the solenoid magnetic field (detected by the magnetometer 40) is equal to the distance r between the magnetometer 40 and the solenoid 50. The motion of the solenoid between the occurrences of these maxima is, therefore, an accurate measure of the horizontal distance between the target well 14 and the relief borehole 24, and this distance can, therefore, be determined directly from the axial motion of the wireline in the target well, without the need for complex mathematical manipulation of signals.

The solenoid 50 located in the target well generates an electromagnetic field which is localized to the target well even when other wells are nearby, and accordingly the uncertainties inherent in other techniques for distance and direction measurements are obviated. As indicated in FIG. 1, the provision of the solenoid in the target well also reduces uncertainties in the location of the target well, as indicated by circle 70 surrounding target well 14 in the illustration of FIG. 1.

The solenoid source 50 also permits determination of the direction from the magnetometer 40 to the target well within an angular precision of plus or minus 2° utilizing the techniques described in U.S. Pat. No. 4,700,142, as outlined above. Thus, the accuracies provided by the solenoid source are more than adequate for guiding the relief well to within about 20 feet of the target well, at which point more precise measurement systems and methods utilizing injected ground currents from an electrode in the relief borehole can be used without undue influence by the nearby wells.

Figure 5:
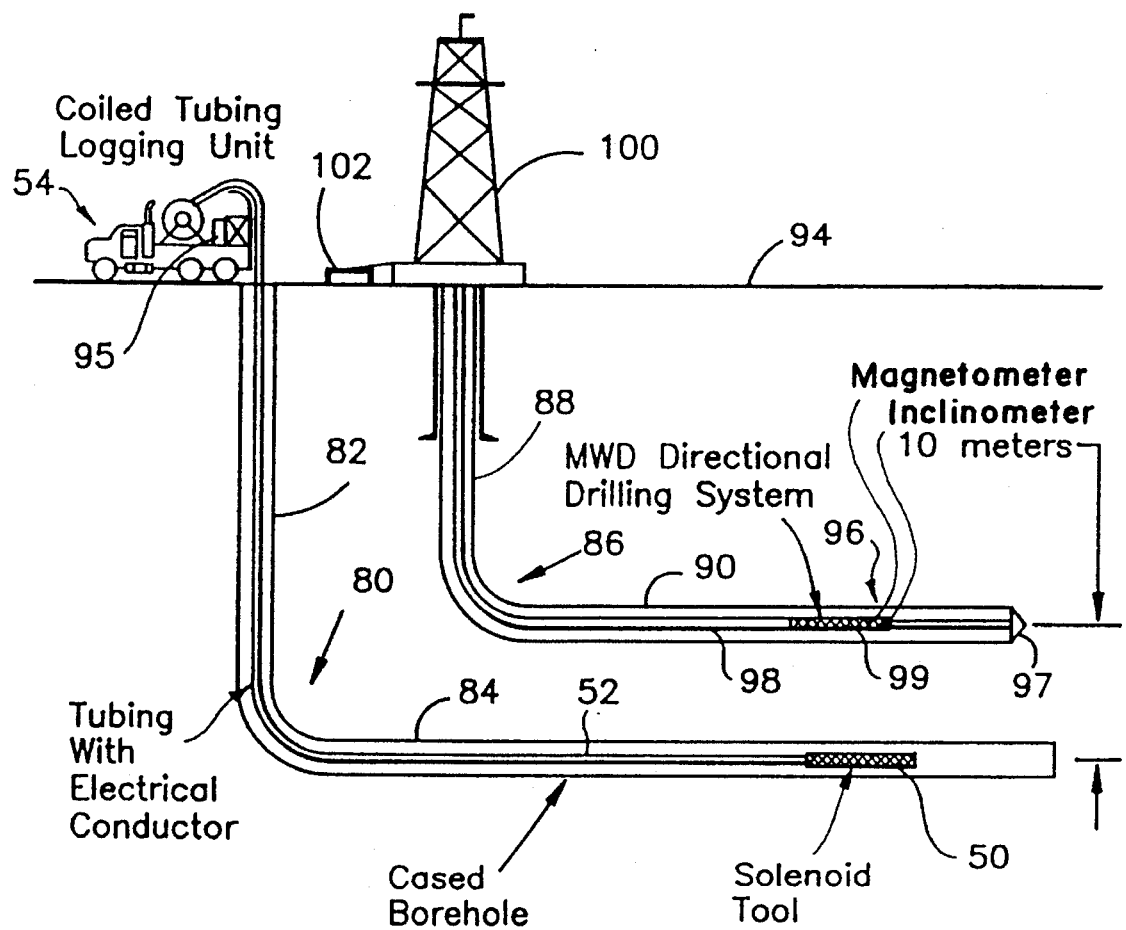
FIG. 5 is a diagrammatic side elevation view of the relative locations of a horizontal target well containing a solenoid and a parallel borehole containing an MWD directional drilling system for distance and direction determination in accordance with a second embodiment of the present invention.

The second embodiment of the present invention is illustrated diagramatically in FIG. 5, in which a generally horizontal well 80 has a vertical portion 82 and a generally horizontal portion 84. The vertical depth of the well may be in the range of 1,500 meters, for example, while the horizontal portion 84 may extend a thousand meters or more. As has been described above, the horizontal well may be of the type used in the petroleum industry in an oil producing sand where it is desired to drill parallel horizontal wells for use in steam assisted recovery projects. Accordingly, as illustrated, a second borehole 86 including an upper, vertical portion 88 and a lower, horizontal 90 is drilled in a controlled trajectory so that its horizontal portion 90 is less than about 20 meters from the horizontal portion 84 of well 80 and is maintained generally parallel to the existing well during drilling. Preferably, the horizontal portion 90 is drilled on a course which is separated by 10 meters, ±1 meter, and is directly above (i.e., within ±3°) the previously drilled and cased well portion 84.

Figure 6:
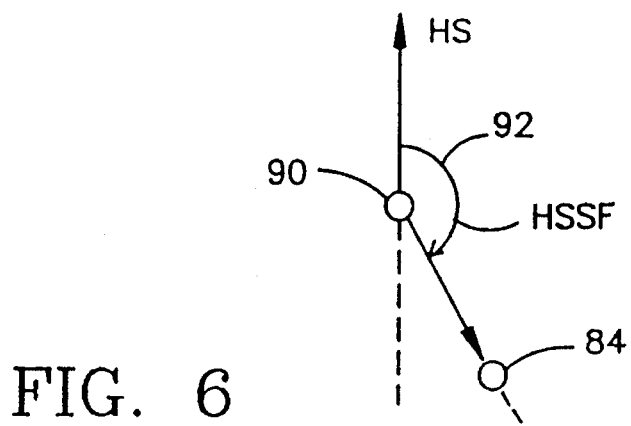
FIG. 6 is an end view of the horizontal well segments of FIG. 5.

The relationship of the horizontal wells is illustrated in FIG. 6, which is an end view of the well portions 84 and 90, showing an angle 92 which is the deviation of borehole 90 from a line vertically above target well 84. As noted above, the horizontal portions of the wells may be about 1,500 meters below the surface 94.

The solenoid 50 of the present invention is illustrated in FIG. 5 as being located in well portion 84, the solenoid being lowered into the target well 80 through the well casing by a wireline or by coiled tubing 52 from a logging vehicle 54. The solenoid preferably is supported on an industry standard coiled tubing unit available from Dowell Schlumberger Corporation, the tubing unit being capable of lowering the solenoid to specified measured depths along the axis of the target well. The solenoid includes windings 56 (FIG. 7), as described above, which are connected to a low frequency source, or a D.C. source 95 whose polarity can be reversed, at the surface of the earth, the source 95 being located, for example, in vehicle 54.

The borehole 86 being drilled is illustrated as incorporating a standard MWD drilling system 96 supported by a drill string 98 from a suitable drilling rig 100 located at the earth's surface 94. As previously noted, the drilling system includes a downhole orientable drilling motor 97 and an electronics package 99 which includes fluxgate magnetometers for measuring the three orthogonal components (x, y, z) of the earth's static magnetic field and inclinometers for measuring the three components (x, y, z) of the earth's gravity vector with respect to the drilling tool. If A.C. measurements were to be made an amplifier and demodulation unit would be added to the MWD unit downhole. The value of the measured quantities is communicated to the surface using a conventional drilling fluid pressure pulse technique, the pulses being detected at sensor and computer 102 and converted to corresponding electrical signals for use in communicating the well surveying data to the drill operators. The output signals from sensor 102, therefore, represent x, y, and z components of the earth's apparent magnetic field and the earth's gravity vector along the coordinate axes illustrated for borehole 90 in FIG. 7, wherein the z coordinate lies along the axis of borehole 90 and the x and y coordinates lie in a plane perpendicular thereto.

At each measurement depth, the MWD drilling system 96 makes two measurements of the earth's apparent magnetic field, one with current in a positive sense flowing in the solenoid, the other with negative. The earth's field components needed for conventional surveying are recovered by averaging the two measurements. The solenoid field is found by taking the difference.

To make a determination of the perpendicular distance r separating well segment 84 from borehole segment 90 (see FIG. 7) and to determine their orientation with respect to each other; that is, to determine the angle 92 between the two wells at some selected depth, the drilling motor 97 is stopped so that the MWD system is stationary with its magnetometers at a known axial depth from the wellhead. The solenoid 50 is then deployed to a point in well segment 84 which is approximately opposite, i.e., is laterally aligned, with the magnetic field sensors of the MWD system 96 with the solenoid off. A standard sequence of survey data measurements of the earth and gravity fields is made by the MWD system 96 and this data is communicated to the surface sensor/computer 102. Thereafter, the solenoid 50 is switched on to generate a slowly varying magnetic field if A.C. techniques are being employed; and another sequence of survey data is obtained. If the effective field strength of the solenoid is known, these two data sets provide all the necessary information to determine both distance and direction between the wells. If a D.C. technique is used, two data sets are obtained, one with the source positive, the other with the source negative.

If the effective strength, or magnetic moment, m of the source 50 is not known; for example, if it is inside a steel casing which provides some shielding, the solenoid is moved a few meters to a new depth after the first set of measurements, and a second MWD data set is obtained with the solenoid switched off and then switched on with opposite senses of current flow. These two sets of data, the depth increment by which the solenoid was moved, and the values of the survey data taken with the solenoid turned off, provide enough information to determine the separation and relative orientation of the wells with respect to each other using the following methods of analysis.

Assuming the axes of well segment 84 and borehole segment 90 are approximately parallel, and expressing the magnetic field components in cartesian coordinates x, y, and z fixed at the observation point 96, which is the location of the magnetometers 99, and using MKS units, the solenoid field components at the activation point are:

$$S_z = \frac{\mu_0 m [2(z/r)^2 - 1]}{4\pi r^3 [1 + (z/r)^2]^{5/2}} \quad \text{(Eq. 4)}$$

$$S_r = \frac{\mu_0 m 3(z/r)}{4\pi r^3 [1 + (z/r)^2]^{5/2}} \quad \text{(Eq. 5)}$$

where in $S_z$ is the field component along the z axis, $S_r$ is the field component along the radius connecting the solenoid and the measuring point projected onto the xy plane, and m is the positive source momentum point in the positive z direction, which is down the borehole axis.

Figure 8:
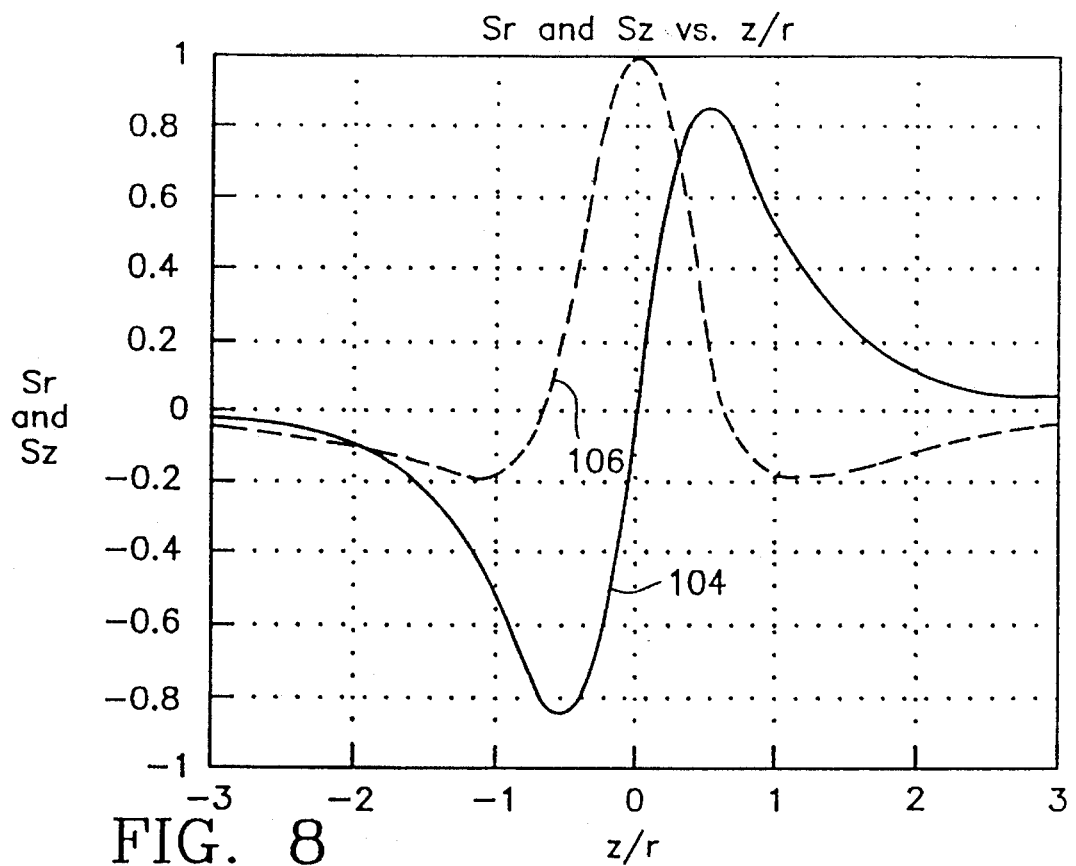
FIG. 8 is a graph representing the relationship between the solenoid field values $S_r$ and $S_z$ measured at the sensor, as a function of the ration z/r.

The values of $S_z$ and $S_r$ are plotted as functions of z/r in FIG. 8, where the solid line 104 represent the value of $S_z$ and the dotted line 106 represents the value of $S_r$, where r is the lateral distance between the two wells, and z is the axial spacing between the solenoid and the point of measurement 96, along the axis of borehole 90.

One way of determining the lateral separation, or distance r between the two wells has been discussed above, with respect to the embodiment of FIG. 2, wherein the lateral distance r is equal to the difference in location of the solenoid 50 at the two maximum values of $S_r$ as the solenoid is moved along borehole 84 past the sensor 96. The distance between the locations of the solenoid at the two maxima is equal to the lateral separation r.

Another way of determining the distance r between the two wells is by noting that the ratio of the axial field $S_z$ to the z derivative of $S_r$, at the point where z=0, has the following value:

$$\frac{S_z}{(dS_r/dz)} = \frac{r}{3} \quad \text{(Eq. 6)}$$

Still another way, and the best way, to determine the distance r between the two wells is to determine the ratio ($S_r/S_z$) at a few depth locations for the solenoid. Mathematically, the ratio $S_r/S_z$ is readily found as a function of z/r at a given depth location to be:

$$S_r/S_z = \frac{3(z/r)}{(2(z/r)^2 - 1)} \quad \text{(Eq. 7)}$$

Figure 9:
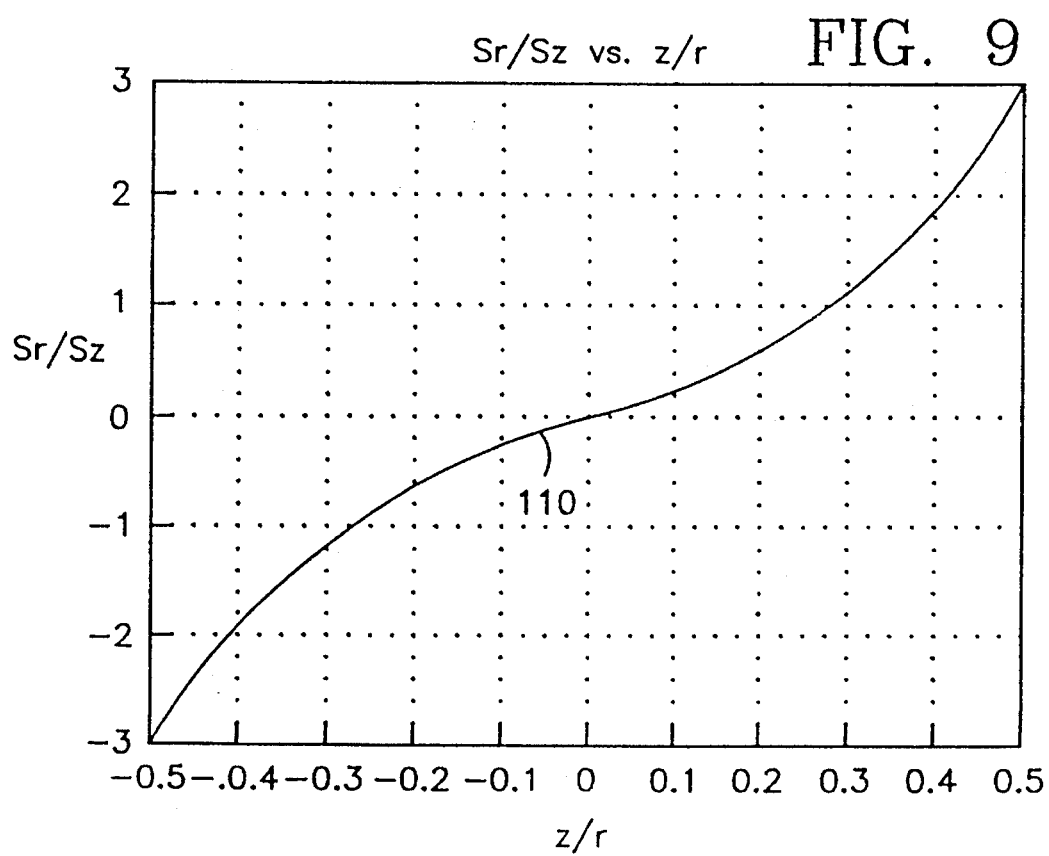
FIG. 9 is a graph representing the relationship between the ratio z/r and the ratio $S_r/S_z$.

The behavior of the function $S_r/S_z$ as a function of z/r is illustrated by curve 110 in FIG. 9.

Assuming that it is possible to set the depth of the sensor 96 and the solenoid source 50 so that they are approximately opposite each other and their z coordinates are approximately the same; i.e., if the following relationship exists:

$$|z/r| < 0.707 \quad \text{(Eq. 8)}$$

then equation 7 is readily solved for z/r:

$$z/r = \frac{3}{4(S_r/S_z)} \left(1 - \sqrt{1 + (8/9)(S_r/S_z)^2}\right) \equiv \alpha \quad \text{(Eq. 9)}$$

Measurement of the ratio of the fields $S_r/S_z$ at two depths $z_1$ and $z_2$ will define two values of $\alpha$; namely, $\alpha_1$ and $\alpha_2$. The value of r; that is, the separation between the wells, can then be found from the relation:

$$r = \frac{z_1 - z_2}{\alpha_1 - \alpha_2} \quad \text{(Eq. 10)}$$

Choosing two depths, one where $S_r/S_z$ is approximately +1 and the other where $S_r/S_z$ is approximately −1; that is, where the value of z/r is approximately ±0.3, are good choices for this purpose.

Once the determination of well separation r at a given depth has been carried out using any of the above methods, the effective magnetic moment m of the source, which may be inside a steel well casing, is readily found from the above equations or from empirical calibration before deployment in the borehole. This value often will remain relatively constant during a sequence of depth measurements, so that the determination of distance and direction can thereafter be carried out at any given depth with a single measurement of the solenoid field. This is done by deploying the solenoid source 50 to a point approximately opposite the measuring system 96, and carrying out a measurement of both $S_r$ and $S_z$. From the ratio $S_r/S_z$, the value of z/r is readily found from Eq. 9. Inserting this value, together with a known value of m from previous evaluations, the separation r can be found from the relationship:

$$r = \left[\frac{\mu_0 m(2(z/r)^2 - 1)}{4\pi S_z (1 + (z/r)^2)^{5/2}}\right]^{1/3} \quad \text{(Eq. 11)}$$

or from $$r = \left[\frac{\mu_0 m 3(z/r)}{4\pi S_r (1 + (z/r)^2)^{5/2}}\right]^{1/3} \quad \text{(Eq. 12)}$$

The xy plane of the MWD tool 96 defines the direction of the vector r, since $S_r$ is generated by measuring $S_x$ and $S_y$ of the solenoid field in the xy plane. Each component of the solenoid field is obtained by subtracting the three earth field components $E_x$, $E_y$, and $E_z$ of the static magnetic field observed with the solenoid off, from the three values of the apparent measurements of the three earth field components with the solenoid turned on.

To determine the orientation of the wells with respect to each other, a measurement of the solenoid field $S_r$ is obtained at a depth where $S_r$ has a convenient non-zero value. The tool key direction TK (FIG. 4) may be the x direction of the MWD tool 96. The angles TKSF, TKEF, and TKHS illustrated in FIG. 4 are found from the voltage outputs of the various xy sensors, as is well known in the art. The angle HSSF is the direction between the high side of the hole and solenoid field, while the angle EFSF is the direction between the earth field and the solenoid field, and these angles give the direction to the solenoid. The relationship between these angles is illustrated in Equations 2 and 3.

By noting whether the solenoid energization current is in the positive or negative sense, and whether the solenoid is deeper or less deep than the MWD sensors, it is readily determined whether the solenoid field projection and in the xy plane points to or away from the target well bore 84 containing the solenoid source.

Figure 10:
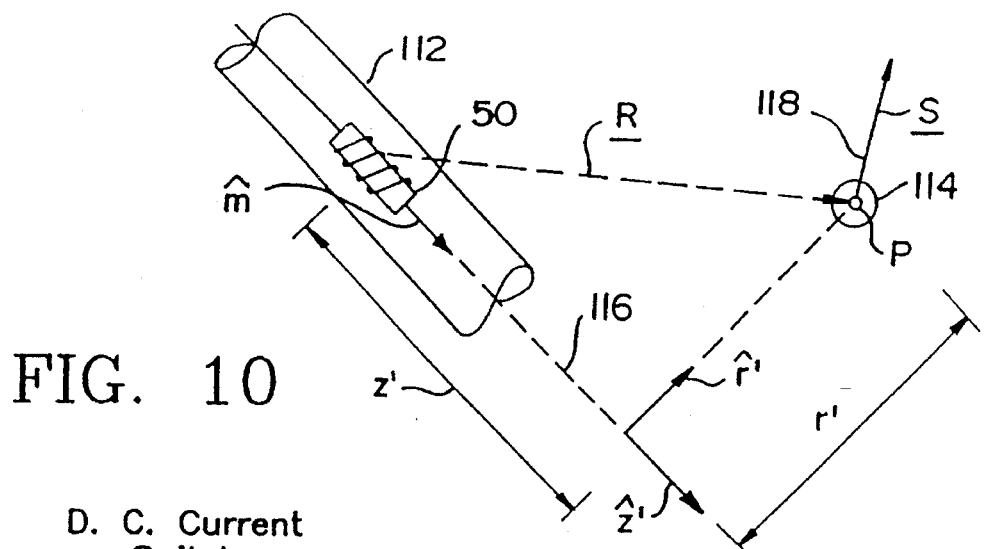
FIG. 10 is a diagrammatic illustration of the relationship between the solenoid source and the MWD sensor in a third, non-parallel, embodiment of the invention.

Although the foregoing theory describes a case when the two wells are approximately parallel, the analysis can be easily adapted to those situations when this is not the case. For example, a target well 112 and a nonparallel borehole 114 are illustrated in FIG. 10 as being at an arbitrary angle with respect to each other. For convenience, it may be assumed that borehole 114 is generally vertical, and that well 112 is generally horizontal. The solenoid 50 is deployed in well 112, which is a surveyed well, with its inclination and an azimuthal direction known from prior measurements, so that the direction of the unit vector m̂, denoting the positive axial direction of the solenoid, is known. This vector, as illustrated in FIG. 10, lies along solenoid axis 116.

The observation point P in borehole 114 is at the location of a sensor such as the MWD directional drilling system 96, the sensor including magnetometers for earth's field measurement and including inclinometers for measuring the slope of the borehole. This system provides the spatial orientation of the borehole 114 and the solenoid field $\underline{S}$ at the point P. The direction and strength of the measured solenoid field vector $\underline{S}$, indicated by vector 118 in FIG. 10, at the observation point P is also known, from the magnetic field evaluation procedures discussed above.

The methods of analysis disclosed above are also readily applied to finding the spatial vector $\underline{R}$ connecting the solenoid source 50 to the observation point P. As in the case of parallel wells, the observation point P is chosen to be at a depth where the source direction indicated by unit vector $\hat{m}$ and the observed solenoid field direction $\underline{S}$ are not parallel, and where the vector dot product of $\hat{m}$ and $\underline{S}$ is less than 0; i.e., where $\hat{m} \bullet \underline{S} < 0$. In the context of parallel wells discussed earlier $|z/r| < 0.707$. The vector $\hat{m}$ and the point P define a plane in which $\underline{S}$ lies as shown in FIG. 10. The unit vector $\hat{r}$ is perpendicular to $\hat{m}$; and the unit vector $\hat{z}$ is parallel to $\hat{m}$, with $\hat{z}$ being effectively the same as $\hat{m}$. This is analagous to the r and z directions shown in FIG. 7. The $\hat{r}$ direction is defined by the component of the solenoid field $\underline{S}$ which is perpendicular to $\hat{m}$, i.e.

$$\hat{r} = \frac{\underline{s} - (\underline{s} \times \hat{m})\hat{m}}{|\underline{s} - (\underline{s} \times \hat{m})\hat{m}|} \quad \text{(Eq. 13)}$$

Figure 7:
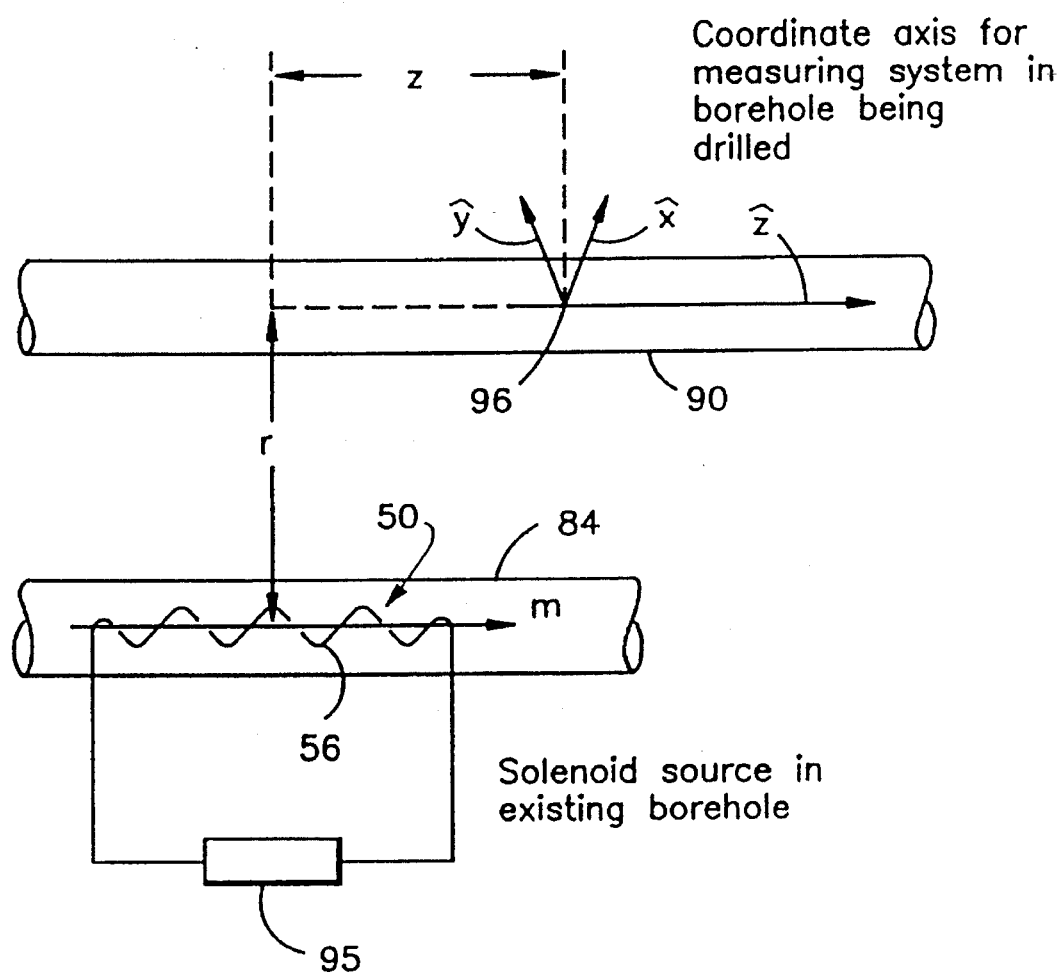
FIG. 7 is a diagrammatic illustration of the relationship between the solenoid source and the MWD sensor in the system of FIG. 5.

This is slightly different from the $\hat{r}$ direction for the case of parallel wells, for in that case, as illustrated in FIG. 7, $\hat{r}$ referred to the direction perpendicular to the axis of the borehole being drilled, i.e., the observation well, in the plane of the two wells. For the case of parallel wells $\hat{r}$ and $\hat{r}$ are the same.

The solenoid field vector $\underline{S}$ can be decomposed as $$\underline{S} = S_z' \hat{z} + S_r' \hat{r} \quad \text{(Eq 14)}$$

$$S_z' = \underline{S} \bullet \hat{m}, S_r' = \underline{S} \bullet \hat{r} \quad \text{(Eq. 15)}$$

The spatial vector R from the solenoid source point to the observation point P can be written as $$\underline{R} = r' \hat{r} + z' \hat{z} = r'(\hat{r} + z'/r' \hat{m}) \quad \text{(Eq. 16)}$$

The ratio of the quantities $S_r'$ and $S_z'$ are inserted into Equation 9 in place of $S_r$ and $S_z$ to yield the ratio $z'/r'$ which is now defined as $\alpha'$. For the case when the effective strength m of the solenoid source is known, $r'$ is found by inserting the ratio $z'/r'$ into equations 11 or 12, and the vector $\underline{R}$ is completely determined from measurements at a single depth station.

For the case when the effective source strength m is not known, two sets of data are taken at neighboring solenoid source depths, $z_1'$ and $z_2'$ along an essentially straight portion of the target well while holding the observation depth P fixed. The above procedure can be used to determine the ratio $z'/r'$ at each depth, with the value so determined being $\alpha_1'$ at the first depth and $\alpha_2'$ at the second. Since the value of $r'$ is the same for both solenoid depths $z_1'$ and $z_2'$, equation 10 can be used to find $r'$. Thus again the vector $\underline{R}_1$ or $\underline{R}_2$ is found at either depth $z_1'$ or $z_2'$ by inserting the appropriate parameters into equation 16, e.g. the spatial vector connecting the source point and the observation point P at deployment depth 1 is given by $$\underline{R}_1 = r'(\hat{r} + \alpha_1' \hat{m}) \quad \text{(Eq. 17)}$$

Figure 11:
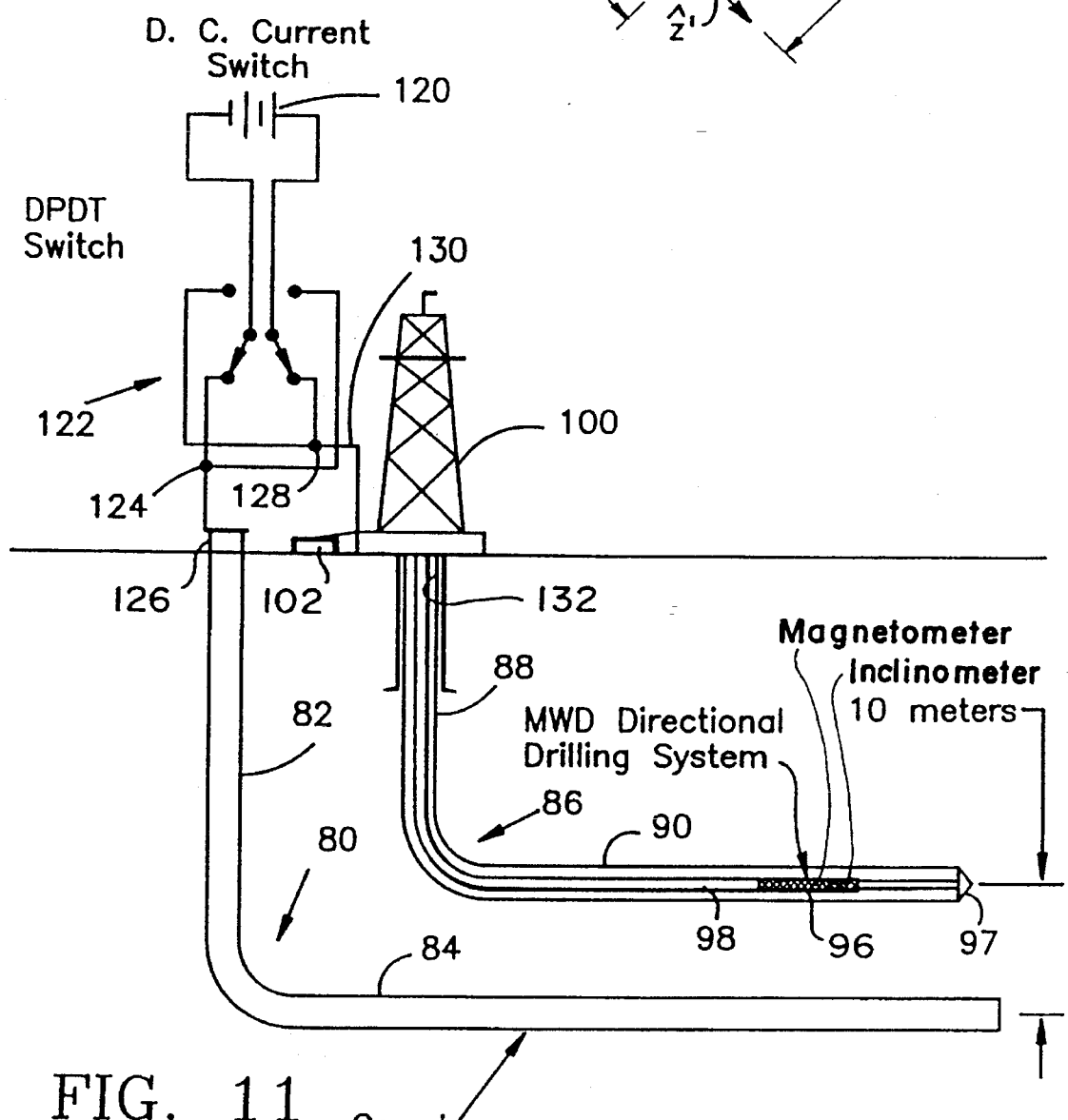
FIG. 11 is a diagrammatic side elevation view of a third embodiment of the invention.

In a third embodiment of the present invention, the method for guiding the drilling of a borehole to be parallel with an existing horizontal well combines the use of the same standard downhole MWD instrumentation, including magnetometers, but instead of a solenoid, utilizes the injection of large direct currents at the wellheads of the wells. This embodiment is illustrated in FIG. 11, wherein the existing cased well 80, as previously described with respect to FIG. 5, has a horizontal segment 84, and the well, or borehole 86 being drilled includes a horizontal section 90 parallel to and spaced from horizontal section 84. As discussed above, borehole 90 includes a directional drilling system which incorporates an MWD capability so that the drill 97 can be guided to cause borehole 86 to follow the target well 84, with data telemetry utilizing conventional drilling fluid pressure pulse techniques being provided.

In sedimentary areas with oil producing sands, the electrical resistance between the well 80 and the borehole 86 is sufficiently low so that the injection of a large direct current into a wellhead is accomplished relatively easily. Furthermore, the bleed-off rate of such currents from well casings is low and can be calculated with sufficient accuracy that at the depth of interest, enough known current will still be on the casing of well 80 to have a significant and measurable effect on the earth's magnetic field sensors in the MWD package 96. Thus the combination of a standard MWD system with fluid data communication and with the injection of direct current at the wellheads results in a system which permits precise drilling control of parallel horizontal wells.

As illustrated in FIG. 11, a D.C. current source 120 having a voltage of about 10 volts and a current capacity of about 100 amperes is connected through a reversing switch 122 having a first output terminal 124 connected to the wellhead 126 of well 80 and having a second output terminal 128 connected by way of line 130 to the wellhead 132 of borehole 86. Reversing switch 122 allows the positive side of the current source to be connected to either of the wellheads 126 and 132, with a negative side of the source being connected to the other.

When a survey is required to determine the location of the borehole segment 90 with respect to target well segment 84, the MWD apparatus 96 is activated by turning the drilling fluid pumps off at the drilling rig 100 to stop the drilling operation. A current of about 100 amperes is then caused to flow in one direction in the cased borehole 80 for approximately 30 seconds, and then switch 122 is reversed to cause current to flow in the opposite direction in the cased borehole for approximately 30 seconds. The MWD apparatus makes two measurements of the three components of the earth's magnetic field; the first measurement is made during the first 30 second interval when the current flow is in a first direction, and the second measurement is made during the second 30 second interval, when the current flow is in the opposite direction. These measurements, together with downhole inclination measurements of the three components of the vertical gravity vector, are then sent to the surface using digital encoding of drilling fluid pressure pulses when the pumps are turned back on, and these values are received at the surface sensor 102. Since downhole measurement and pressure telemetering of the earth's magnetic field and well inclination measurements are known in MWD surveying systems, the measurement of the magnetic field produced by the direct current at a given location of the MWD system 96 is a simple matter. If desired, two sequential survey measurements at a given depth, one with the current injection system on, and one with it off, or with its polarity reversed, can be easily done to provide a base for comparison of later measurements.

To obtain the standard survey parameters to determine the direction of the well being drilled, the earth's magnetic field data obtained with the current injection in a first (positive) direction is averaged with the earth's magnetic field data with the current direction in the opposite (negative) direction. The electromagnetic field data for the required proximity determination is found by simply taking the difference in the MWD magnetic field measurements obtained with the current in a first direction and with the current reversed.

Precise measurements of the electrical conductivity of the earth's strata are carried out for virtually every oil or gas well that is drilled. Using these conductivity values to compute the particulars of electrical current flows on oil well casings of given resistance per unit length and radius is also a developed art. Using these known measurements, the following approximate relationship for the current flow I on the casing of well 80 at a depth z holds:

$$\lambda = \sqrt{ln(\lambda/a)/(2\pi\sigma R)} \qquad \text{(Eq. 19)}$$

where a is the casing radius, R is the resistance per unit length of the well casing which is in an earth of uniform conductivity $\sigma$, and $I_o$ is the current injected at the surface.

For an earth conductivity $\sigma$ of about 0.1 (ohm meter)$^{-1}$ and a 7-inch diameter steel casing in well 80 weighing 23 pounds per foot, the exponentiation distance $\lambda$ is approximately 600 meters. The magnetic field at a depth of 1000 meters, 10 meters away from the reference well for these conditions is approximately 0.7 microTesla, which is well within the sensitivity of a typical MWD system, so that the apparatus gives useful results.

The present invention has been described in terms of a solenoid movable relative to a sensor in adjacent, nearly vertical wells as well as a movable solenoid in adjacent horizontal wells, to parallel and to non-parallel wells, and to systems where the sensor is included in an MWD system. The invention is also described in terms of an embodiment in which a reversible DC current is applied across the two wells, with the measurements being made by a conventional MWD device. As illustrated, therefore, the current source in the target well can be a solenoid having a slowly varying current or a direct current, or may be a reversible direct current supplied across the two wells. The sensing magnetometer can be deployed independently, or as an integral part of the drill string in an MWD system.

Although the invention has been described in terms of preferred embodiments, it will be apparent to those of skill in the art that the invention is limited only by the scope of the following claims.

What is claimed is:

1. A method for determining the distance from a borehole to a nearby, substantially parallel target well, comprising:

positioning a magnetic field sensor at a first depth within a partially drilled borehole to detect x, y, and z components of magnetic fields at the location of said sensor;

placing a solenoid in a target well;

energizing the solenoid to produce a magnetic field in the earth surrounding the target well and the borehole;

positioning said energized solenoid in said target well at locations above and below a plane perpendicular to said borehole at said first depth;

measuring at said sensor the magnitude of the x, y, and z components of said solenoid magnetic field at selected locations of said solenoid to identify magnetic field maximum values on opposite sides of said plane;

measuring the depth of said solenoid in said target well for each magnetic field maximum value; and determining the difference between the depths of said solenoid at each of said field maximum values, which difference is equal to the lateral distance between said sensor in said relief borehole and said solenoid in said target well at said first depth.

2. A method for determining the lateral distance r between two spaced wells, comprising:

positioning a magnetic field sensor at a first depth in a first well;

positioning a solenoid in a second well adjacent and generally parallel to said first well;

energizing said solenoid to produce a magnetic field in the earth surrounding said first and second wells;

measuring said magnetic field at said sensor for at two depths $z_1$ and $z_2$ of said solenoid along the axis of said second well to determine at each depth the lateral component $S_r$ and the axial component $S_z$ of said solenoid magnetic field at said first well;

obtaining the ratio $S_r/S_z$ at each of said two depths $z_1$ and $z_2$ in said second well to provide two corresponding values $\alpha_1$ and $\alpha_2$ from the relationship:

$$z/r = \frac{3}{4(S_r/S_z)}(1 - \sqrt{1 + (8/9)(S_r/S_z)^2}) \equiv \alpha; \text{ and}$$

determining the lateral distance r between said wells where $$r = \frac{z_1 - z_2}{\alpha_1 - \alpha_2}.$$

3. The method of claim 2, further including determining the value of the magnetic momentum m of said solenoid magnetic field from one of the equations:

$$S_z = \frac{\mu_o m(2(z/r)^2 - 1)}{4\pi r^3(1 + (z/r)^2)^{5/2}}$$

and $$S_r = \frac{\mu_o m 3(z/r)}{4\pi r^3(1 + (z/r)^2)^{5/2}},$$

to permit determination of the lateral distance r at any given depth with a single measurement of said solenoid magnetic field components $S_r$ and $S_z$ from such selected depth by further determining the value of the ratio z/r from the relationship $$z/r = \frac{3}{4(S_r/S_z)}(1 - \sqrt{1 + (8/9)(S_r/S_z)^2}); \text{ and}$$

determining the lateral distance r from one of the relations $$r = \left[\frac{\mu_o m(2(z/r)^2 - 1)}{4\pi S_z(1 + (z/r)^2)^{5/2}}\right]^{1/3}$$

and $$r = \left[\frac{\mu_o m 3(z/r)}{4\pi S_r(1 + (z/r)^2)^{5/2}}\right]^{1/3}.$$

4. The method of claim 2, further including selecting said depths $z_1$ and $z_2$ to produce values of approximately +1 and −1, respectively, for the ratio $S_r/S_z$.

5. A method of determining the lateral distance r between two spaced wells, comprising:

determining empirically the magnetic moment m of a solenoid;

positioning a magnetic field sensor at a first depth z in a first well;

positioning said solenoid in a second well adjacent and generally parallel to said first well;

energizing said solenoid to produce a magnetic field in the earth surrounding said first and second wells;

measuring said magnetic field at said sensor at said first depth to determine the lateral component $S_r$ and the axial component $S_z$ of said solenoid magnetic field at said first well;

determining the ratio $S_r/S_z$;

determining the value of the ratio z/r from the relationship $$z/r = \frac{3}{4(S_r/S_z)}(1 - \sqrt{1 + (8/9)(S_r/S_z)^2}); \text{ and}$$

determining the lateral distance r from one of the relations:

$$r = \left[\frac{\mu_o m(2(z/r)^2 - 1)}{4\pi S_z(1 + (z/r)^2)^{5/2}}\right]^{1/3}$$

and $$r = \left[\frac{\mu_o m 3(z/r)}{4\pi S_r(1 + (z/r)^2)^{5/2}}\right]^{1/3}.$$

6. A method for determining the distance and direction from a first well to a second well, comprising:

lowering a sensor tool including a magnetometer and orienting means to a first depth in a first well;

lowering a solenoid having a known magnetic moment m into a second well to a known depth z with known inclination and known axial direction $\hat{m}$;

energizing said solenoid to produce a target solenoid magnetic field $\underline{S}$ in the earth surrounding said first and second wells;

measuring at said sensor tool three vector components $S_x'$, $S_y'$ and $S_z'$ of the target solenoid magnetic field $\underline{S}$ at the sensor tool; and determining from said target solenoid magnetic field components at said sensor the direction from said first well to said second well.

7. The method of claim 6, wherein the step of determining the direction from said first well to said second well comprises:

determining the quantity $S_z' = \underline{S} \bullet \hat{m}$;

determining a separation unit vector $\hat{r}$ which is the component of the target solenoid field $\underline{S}$ which is perpendicular to m from the equation $$\hat{r} = \frac{\underline{s} - (\underline{s} \times \hat{m})\hat{m}}{|\underline{s} - (\underline{s} \times \hat{m})\hat{m}|};$$

determining the value of the solenoid magnetic field component $S_r'$ which is perpendicular to the axial direction $\hat{m}$ as follows:

$$\underline{S} = S_z'\hat{m} + S_r'\hat{r};$$

determining the ratio z'/r' as follows:

$$\frac{z'}{r'} = \frac{3}{4(S_r/S_z)}(1 - \sqrt{1 + (8/9)(S_r/S_z)^2}) \equiv \alpha;$$

determining the separation r' of the solenoid from the sensor tool from $$r' = \left[\frac{\mu_o m(2(z'/r')^2 - 1)}{4\pi S_z'(1 + (z'/r')^2)^{5/2}}\right]^{1/3};$$

where $\mu_o$ is $4\pi\ 10^{-7}$; and determining the spatial vector $\underline{R}$ representing the distance and direction from the solenoid to the sensor tool from $$\underline{R} = r'[\hat{r} + (z'/r')\hat{z}]$$

8. A method for determining the distance and direction from a first well to a second well, comprising:

lowering a sensor tool including a magnetometer and orienting means to a first depth in a first well;

lowering a solenoid into a second well to a first known depth $z_1'$ with known inclination and known direction;

energizing said solenoid to produce a target magnetic field in the earth surrounding said first and second wells;

repositioning said energized solenoid at a second known depth $z_2'$ within said second well;

measuring at said sensor tool three vector components $S_x$, $S_y$ and $S_z$ of said target S to obtain magnetic field vectors $\underline{S}_1$ and $\underline{S}_2$ at each of said first and second depths $z_1'$ and $z_2'$;

determining the quantities $$S_{1z}' = \underline{S}_1 \bullet \hat{m}$$

and $$S_{2z}' = \underline{S}_2 \bullet \hat{m}$$

where m is the magnetic moment of the solenoid;

determining separation unit vector $\hat{r}$ which is the part of the target solenoid field vectors $\underline{S}_1$ or $\underline{S}_2$ which is perpendicular to $\hat{m}$ at said first and second depths from the equations $$\hat{r} = \frac{\underline{S}_1 - (\underline{S}_1 \times \hat{m})\hat{m}}{|\underline{S}_1 - (\underline{S}_1 \times \hat{m})\hat{m}|}$$

or $$\hat{r} = \frac{\underline{S}_2 - (\underline{S}_2 \times \hat{m})\hat{m}}{|\underline{S}_2 - (\underline{S}_2 \times \hat{m})\hat{m}|};$$

determining the values of the solenoid magnetic field components $S_{1r}'$ and $S_{2r}'$ which are perpendicular to the axial direction $\hat{m}$ as follows:

$$\underline{S}_1 = S_{1z}'\hat{m} + S_{1r}'\hat{r}$$

and $$\underline{S}_2 = S_{2z}'\hat{m} + S_{2r}'\hat{r}$$

determining the ratios $z_1'/r'$ and $z_2'/r'$ as follows:

$$\frac{z_1'}{r'} = \frac{3}{4(S_{1r}/S_{1z})} (1 - \sqrt{1 + (8/9)(S_{1r}/S_{1z})^2}) \equiv \alpha_1$$

and $$\frac{z_2'}{r'} = \frac{3}{4(S_{2r}/S_{2z})} (1 - \sqrt{1 + (8/9)(S_{2r}/S_{2z})^2}) \equiv \alpha_2$$

determining the separation r' of the solenoid from the sensor tool from:

$$r' = \frac{\alpha_1' - \alpha_2'}{z_1' - z_2'} \; ; \text{ and}$$

determining the spatial vector $\underline{R}$ representing the distance and direction from one of the solenoid locations to the sensor tool from:

$$\underline{R}_1 = r' \; \hat{r}' + (z_1'/r') \; \hat{z}'.$$

9. The method of claim 8, further including:

determining the magnetic moment m from the relationship $$S_{1z} = \frac{\mu_0 m [2(z_1'/r')^2 - 1]}{4\pi r^3 [1 + (z_1'/r')^2]^{5/2}} \; ; \text{ and}$$

determining the spatial vector $\underline{R}$ of the solenoid from the sensor tool at any depth from the relation:

$$\underline{R} = r'[\hat{r}' + (z'/r') \; \hat{z}'].$$

10. The method of claim 6, wherein the step of determining direction includes determining the orientation of said magnetometer within said first well at said first depth;

measuring the vector components of said magnetic field at said magnetometer and determining a direction from said first well to said second well relative to said magnetometer; and determining from the orientation of said magnetometer and the relative direction of said second well the actual direction of said second well from said first well.

11. A method for determining the distance from a borehole to a nearby, substantially parallel well, comprising:

positioning an MWD directional drilling system at a first depth within a borehole said drilling system having a sensor to detect vector components of magnetic fields at said first depth;

measuring components of the earth's apparent magnetic field at said sensor;

supplying a DC current reversible between first and second directions to electrically conductive material in a nearby target well to produce a reversible magnetic field superimposed on the earth's magnetic field;

measuring, during a first time interval, vector components of the total magnetic field at said sensor with said direct current in said first direction;

measuring, during a second time interval, vector components of the total magnetic field at said sensor with said direct current in said second direction; and determining, from differences between measurements of magnetic field vector components at said first and second intervals, the distance between said borehole and said well at said first depth.

12. The method of claim 11, further including:

measuring at said sensor vector components of the earth's gravity; and determining, from said components of said direct current magnetic field and said vector components of gravity, the direction from said sensor to said target well.

13. Apparatus for measuring the distance and direction between points in two boreholes extending into the earth, comprising:

a solenoid deployed at a first selected point in a first borehole, said first borehole having a known inclination and direction at said selected point;

means energizing said solenoid to generate a characteristic known solenoid magnetic field;

a magnetic field sensor deployed at a second selected point in said second borehole, said field sensor including means measuring three vector components of said characteristic solenoid magnetic field at said second point;

orientation means to determine the spatial orientation of said magnetic field sensor at said second point in said second borehole; and means responsive to said spacial orientation of said sensor and to said measured vector components at said second point in said second borehole and further responsive to said characteristic known solenoid magnetic field to determine the distance and direction between said first and second points.

14. The apparatus of claim 13, wherein said magnetic field sensor and said orientation means are carried by a measurement while drilling downhole instrument.

15. The apparatus of claim 14, wherein said sensor comprises a magnetometer.

16. A method for measuring the distance and direction between points in two boreholes extending into the earth, comprising:

determining inclination and direction of a first borehole;

deploying a solenoid at a first selected point in said first borehole;

energizing the solenoid to generate a characteristic solenoid magnetic field;

deploying a magnetic field sensor at a second selected point in a second borehole;

measuring with said magnetic field sensor three vector components of the characteristic solenoid magnetic field produced in said second borehole by energization of said solenoid;

determining the spacial orientation of the magnetic field sensor in said second borehole; and determining from the generated solenoid characteristic field, from the measured magnetic field components, and from said spacial orientation and said inclination and direction determinations the distance and direction between the solenoid and the magnetic field sensor at said first and said second points, respectively.

17. The method of claim 11, wherein the step of determining the distance between said borehole and said well includes measurement of magnetic field components at said sensor prior to supplying said DC current and measurement of magnetic field components at said sensor during the supplying of DC current.

18. A method for determining the distance from a borehole to a nearby substantially parallel well in a plane substantially perpendicular to said borehole, comprising:

positioning at a first depth within a borehole a magnetic field sensor for detecting x and y vector components of magnetic fields at said first depth;

measuring during a first time interval, x and y vector components of the earth's magnetic field at said sensor;

thereafter supplying at said well a D.C. current reversible between first and second directions;

measuring, during a second time interval the x and y vector components of the earth's apparent magnetic field at said sensor with said D.C. current flowing in said first direction;

determining the differences between said earth's magnetic field components and said earth's apparent magnetic field components measured during said first and second time intervals; and determining from said differences the distance between said borehole and said well at said first depth.

19. The method of claim 18, further including:

measuring, during a third time interval, x and y vector components of the earth's apparent magnetic field at said sensor with said D.C. current in said second direction; and determining the differences between said earth's magnetic field vector components and said apparent magnetic field vector components measured during said first and third time intervals.

20. The method of claim 19, wherein the step of determining the distance between said borehole and said well includes determining the strength of the target magnetic field vectors at said sensor during said first and third intervals.

21. A method for determining the distance from a relief borehole to a target well, comprising:

lowering a magnetic field sensor into a partially drilled relief borehole;

fixing the sensor at a first depth within the borehole;

lowering a solenoid into a target well;

energizing the solenoid with a low-frequency alternating current to produce an alternating magnetic field in the earth surrounding the target well and the relief borehole;

moving said energized solenoid vertically in said target well, said solenoid passing through a horizontal plane at said first depth;

measuring at said sensor the magnitude of the horizontal component of said magnetic field to identify magnetic field maximum values above and below said horizontal plane during the vertical motion of said solenoid;

measuring the depth of said solenoid in said target well for each magnetic field maximum value; and determining the difference between the depths of said solenoid at each magnetic field maximum value, which difference is equal to the distance between said sensor in said relief borehole and said solenoid in said target well at said first depth.

22. A method for determining the distance between two spaced wells, comprising:

lowering fluxgate magnetometers to a first depth in a first well;

lowering a solenoid into a second wall;

energizing said solenoid to produce a magnetic field in the earth surrounding said first and second wells;

moving said energized solenoid along the axis of said second well, said solenoid passing through said first depth during its motion;

measuring said magnetic field at said magnetometer at a multiplicity of depths of said solenoid along the axis of said second well to determine the maximum magnitudes of the measured magnetic field when said solenoid is above said first depth and when said solenoid is below said first depth; and determining the depths of said solenoid when said maximum magnitudes are determined to obtain the horizontal distance between said first and second wells.

23. The method of claim 22, wherein the step of determining the distance between said first and second wells includes measuring an upper depth of said solenoid when said magnetic field is at said maximum magnitude above said first depth, and measuring a lower depth of said solenoid when said magnetic field is at said maximum magnitude below said first depth; and determining the difference between said upper and lower depths to obtain a direct measurement of said horizontal distance.

24. A method for determining the distance and direction from a first well to a second well, comprising:

lowering a sensor tool including a magnetometer and orienting means to a first depth in a first well;

lowering a solenoid into a second well;

energizing said solenoid to produce a target magnetic field in the earth surrounding said first and second wells;

moving said energized solenoid along the axis of said second well, said solenoid passing through said first depth;

measuring at said sensor tool the magnitude of said magnetic field at a multiplicity of solenoid depths;

determining the depths of said solenoid at which the magnitude of the horizontal components of said magnetic field is at a maximum for solenoid locations above and below said first depth to thereby obtain a direct measure of the horizontal distance between said first and second wells at said first depth; and determining from said magnetic field at said sensor the direction from said first well to said second well.

25. The method of claim 24, wherein the step of determining direction includes determining spaced orientation of said magnetometer within said first well at said first depth;

measuring the horizontal components of said magnetic field at said magnetometer and determining a direction from said first well to said second well relative to said magnetometer; and determining from the orientation of said magnetometer and the relative direction of said second well a compass direction to said second well from said first well.

26. The apparatus of claim 13, wherein said second selected point is located in a plane passing through said first selected point, said plane being perpendicular to a longitudinal axis of said first borehole.

27. The apparatus of claim 13, wherein said means energizing said solenoid comprises means for energizing said solenoid with a reversible direct current.

28. The apparatus of claim 27, wherein said first and second selected points line in a plane perpendicular to a longitudinal axis of said first borehole, and further including means for moving said solenoid selectively to third and fourth points on opposite sides of said plane, respectively, for measurements of vector components of said characteristic solenoid magnetic field with said solenoid at said third and fourth points.

29. The method of claim 16, wherein the step of energizing the solenoid includes supplying to the solenoid a direct current having a first direction for a first period of time and thereafter supplying to the solenoid a known direct current having a second direction for a second period of time to generate said characteristic solenoid magnetic field, and measuring vector components of said characteristic solenoid magnetic field during said first and second periods of time to obtain a first set of measured vector components.

30. The method of claim 16, wherein the step of deploying a magnetic field sensor in a second borehole includes locating the sensor at a selected first depth along the second borehole and wherein the step of deploying a solenoid in a first borehole includes positioning the solenoid along the first borehole at substantially said first depth.

31. The method of claim 30, wherein the step of energizing the solenoid includes supplying to the solenoid a direct current having a first direction for a first period of time and thereafter supplying to the solenoid a known direct current having a second direction for a second period of time to generate said characteristic solenoid magnetic field, and measuring vector components of said characteristic solenoid magnetic field during said first and second periods of time to obtain a first set of measured vector components.

32. The method of claim 30, further including moving said solenoid a known depth increment to a second depth along said first borehole and thereafter supplying to the solenoid said direct current having said first direction for said first period of time and supplying said direct current having said second direction for said second period of time to obtain a second set of measured vector components, the determination of distance and direction additionally including said second set of measured vector components and said depth increment.

33. The method of claim 16, wherein the step of measuring vector components includes measuring vector components in a plane perpendicular to the longitudinal axis of said second borehole, and wherein the step of determining distance and direction includes determining the distance and direction along said plane from said sensor to said solenoid.

* * * * *